(12) United States Patent
Yoon et al.

(10) Patent No.: US 9,166,644 B2
(45) Date of Patent: Oct. 20, 2015

(54) TRANSCEIVER AND ANTENNA ASSEMBLY

(75) Inventors: Seunghwan Yoon, Costa Mesa, CA (US); Nicolaos G. Alexopoulos, Irvine, CA (US); Jesus Castaneda, Los Angeles, CA (US)

(73) Assignee: Broadcom Corporation, Irvine, CA (US)

( * ) Notice: Subject to any disclaimer, the term of this patent is extended or adjusted under 35 U.S.C. 154(b) by 766 days.

(21) Appl. No.: 12/985,527

(22) Filed: Jan. 6, 2011

(65) Prior Publication Data

US 2011/0188552 A1 Aug. 4, 2011

Related U.S. Application Data

(60) Provisional application No. 61/322,865, filed on Apr. 11, 2010, provisional application No. 61/300,351, filed on Feb. 1, 2010.

(51) Int. Cl.
*H01Q 1/38* (2006.01)
*H04B 1/38* (2015.01)

(52) U.S. Cl.
CPC ........................................ *H04B 1/38* (2013.01)

(58) Field of Classification Search
USPC ........... 370/201, 465, 535; 343/700 MS, 853; 333/132, 202, 17.1; 375/267
See application file for complete search history.

(56) References Cited

U.S. PATENT DOCUMENTS

| | | | |
|---|---|---|---|
| 5,179,362 A * | 1/1993 | Okochi et al. | ................. 333/181 |
| 6,795,714 B1 | 9/2004 | Fickenscher et al. | |
| 2005/0179607 A1 * | 8/2005 | Gorsuch et al. | ................ 343/754 |
| 2007/0002722 A1 * | 1/2007 | Palaskas et al. | ................ 370/201 |
| 2007/0018754 A1 | 1/2007 | Okuyama | |
| 2008/0180333 A1 * | 7/2008 | Martiskainen et al. | ........ 343/722 |
| 2008/0252536 A1 | 10/2008 | Anguera et al. | |
| 2008/0258977 A1 | 10/2008 | Kim et al. | |
| 2009/0027278 A1 * | 1/2009 | Soora et al. | .................... 343/702 |
| 2009/0073054 A1 | 3/2009 | Yoon et al. | |
| 2009/0196371 A1 * | 8/2009 | Yamamoto et al. | ............ 375/267 |
| 2010/0040184 A1 * | 2/2010 | Haralabidis et al. | ........... 375/373 |

FOREIGN PATENT DOCUMENTS

| | | |
|---|---|---|
| WO | 9827614 A1 | 6/1998 |
| WO | 2006062059 A1 | 6/2006 |

OTHER PUBLICATIONS

European Search Report; EP Application No. 11001827.2; Apr. 2, 2013; 3 pages.

* cited by examiner

*Primary Examiner* — Sue A Purvis
*Assistant Examiner* — Jae Kim
(74) *Attorney, Agent, or Firm* — Garlick & Markison; Randy W. Lacasse

(57) ABSTRACT

A dongle transceiver a substrate, a transceiver circuit, a transmit/receive switch, a MIMO antenna structure, and a decoupling module. The transceiver circuit is on at least one of the first and second sides of the substrate and is coupled to the transmit/receive switch. The MIMO antenna structure is on at least one of the first and second sides of the substrate. The decoupling module is on at least one of the first and second sides of the substrate, couples the MIMO antenna structure to the transmit/receive switch, and electrically isolates antennas of the MIMO antenna structure.

13 Claims, 17 Drawing Sheets device 10 decoupling module 100

TRANSCEIVER AND ANTENNA ASSEMBLY

CROSS REFERENCE TO RELATED PATENTS

The present U.S. Utility Patent Application claims priority pursuant to 35 U.S.C. §119(e) to the following U.S. Provisional Patent Applications which are hereby incorporated herein by reference in their entirety and made part of the present U.S. Utility Patent Application for all purposes:

1. U.S. Provisional Application Ser. No. 61/322,865, entitled "2.4 GHZ MIMO 2×2 Dongle Antenna Structure,", filed Apr. 11, 2010; and 2. U.S. Provisional Application Ser. No. 61/300,351, entitled "High Isolation MIMO Antenna Structure,", filed Feb. 1, 2010.

STATEMENT REGARDING FEDERALLY SPONSORED RESEARCH OR DEVELOPMENT

NOT APPLICABLE

INCORPORATION-BY-REFERENCE OF MATERIAL SUBMITTED ON A COMPACT DISC

NOT APPLICABLE

BACKGROUND OF THE INVENTION

1. Technical Field of the Invention

This invention relates generally to wireless communication systems and more particularly to antennas used in such systems.

2. Description of Related Art

Communication systems are known to support wireless and wire lined communications between wireless and/or wire lined communication devices. Such communication systems range from national and/or international cellular telephone systems to the Internet to point-to-point in-home wireless networks to radio frequency identification (RFID) systems. Each type of communication system is constructed, and hence operates, in accordance with one or more communication standards. For instance, radio frequency (RF) wireless communication systems may operate in accordance with one or more standards including, but not limited to, RFID, IEEE 802.11, Bluetooth, advanced mobile phone services (AMPS), digital AMPS, global system for mobile communications (GSM), code division multiple access (CDMA), WCDMA, local multi-point distribution systems (LMDS), multi-channel-multi-point distribution systems (MMDS), LTE, WiMAX, and/or variations thereof. As another example, infrared (IR) communication systems may operate in accordance with one or more standards including, but not limited to, IrDA (Infrared Data Association).

Depending on the type of RF wireless communication system, a wireless communication device, such as a cellular telephone, two-way radio, personal digital assistant (PDA), personal computer (PC), laptop computer, home entertainment equipment, RFID reader, RFID tag, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each RF wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to the antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

Since the wireless part of a wireless communication begins and ends with the antenna, a properly designed antenna structure is an important component of wireless communication devices. As is known, the antenna structure is designed to have a desired impedance (e.g., 50 Ohms) at an operating frequency, a desired bandwidth centered at the desired operating frequency, and a desired length (e.g., ¼ wavelength of the operating frequency for a monopole antenna). As is further known, the antenna structure may include a single monopole or dipole antenna, a diversity antenna structure, the same polarization, different polarization, and/or any number of other electro-magnetic properties.

One popular antenna structure for RF transceivers is a three-dimensional in-air helix antenna, which resembles an expanded spring. The in-air helix antenna provides a magnetic omni-directional monopole antenna. Other types of three-dimensional antennas include aperture antennas of a rectangular shape, horn shaped, etc; three-dimensional dipole antennas having a conical shape, a cylinder shape, an elliptical shape, etc.; and reflector antennas having a plane reflector, a corner reflector, or a parabolic reflector. An issue with such three-dimensional antennas is that they cannot be implemented in the substantially two-dimensional space of a substrate such as an integrated circuit (IC) and/or on the printed circuit board (PCB) supporting the IC.

Two-dimensional antennas are known to include a meandering pattern or a micro strip configuration. For efficient antenna operation, the length of an antenna should be ¼ wavelength for a monopole antenna and ½ wavelength for a dipole antenna, where the wavelength ($\lambda$)=c/f, where c is the speed of light and f is frequency. For example, a ¼ wavelength antenna at 900 MHz has a total length of approximately 8.3 centimeters (i.e., $0.25*(3\times10^8 \text{ m/s})/(900\times10^6 \text{ c/s})$ =0.25*33 cm, where m/s is meters per second and c/s is cycles per second). As another example, a ¼ wavelength antenna at 2400 MHz has a total length of approximately 3.1 cm (i.e., $0.25*(3\times10^8 \text{ m/s})/(2.4\times10^9 \text{ c/s}) = 0.25*12.5 \text{ cm}$).

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWING(S)

DETAILED DESCRIPTION OF THE INVENTION

Figure 1:
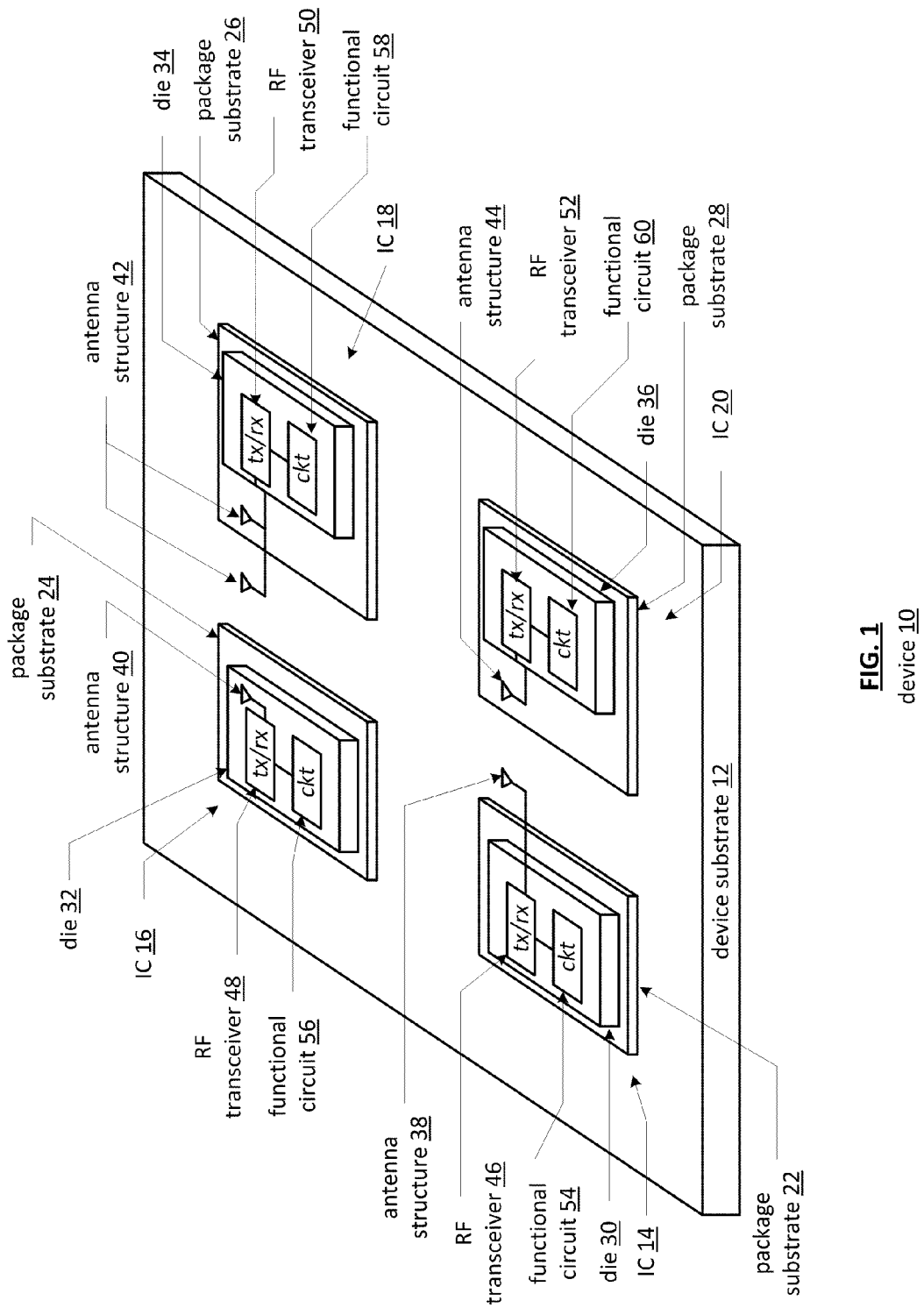
FIG. 1 is a diagram of an embodiment of a device in accordance with the present invention.

FIG. 1 is a diagram of an embodiment of a device 10 that includes a device substrate 12 and one or more circuits 14-20 (four shown). Each of the circuits (which may be fabricated on the substrate 12 or as ICs) includes a circuit module 56, a transceiver circuit 48, a transmit/receive switch (shown in one or more subsequent figures), a decoupling module (shown in one or more subsequent figures), and an antenna structure 40 (which may be a multiple input multiple output (MIMO) antenna structure).

If the circuits are fabricated as ICs, then they include a package substrate 22-28 a die 30-36 where some or all of the other components are on the die or substrate. For example, die 30 of circuit 14 includes a functional circuit 54 and a transceiver circuit 46 coupled to an antenna structure 38 on the substrate 12. Die 32 of circuit 16 includes an antenna structure 40, an RF transceiver 48, and a functional circuit 56. Die 34 of circuit 18 includes an RF transceiver 50 and a function circuit 58 and the package substrate 26 of circuit 18 and the substrate 12 supports an antenna structure 42 that is coupled to the RF transceiver 52. Die 36 of circuit 20 includes an RF transceiver 52 and a function circuit 60 and the package substrate 28 of circuit 20 supports an antenna structure 44 coupled to the RF transceiver 52.

The device 10 may be any type of electronic equipment that includes integrated circuits and may be in any form factor. For example, but far from an exhaustive list, the device 10 may have any form factor (including a USB dongle, another interfacing dongle, handheld, etc.) and may be a personal computer, a laptop computer, a hand held computer, a wireless local area network (WLAN) access point, a WLAN station, a cellular telephone, a digital cellular network interface, an audio entertainment device, a video entertainment device, a video game control and/or console, a radio, a cordless telephone, a cable set top box, a satellite receiver, network infrastructure equipment, a cellular telephone base station, and Bluetooth head set. Accordingly, the functional circuit 54-60 may include one or more of a WLAN baseband processing module, a WLAN RF transceiver, a cellular voice baseband processing module, a cellular voice RF transceiver, a cellular data baseband processing module, a cellular data RF transceiver, a local infrastructure communication (LIC) baseband processing module, a gateway processing module, a router processing module, a game controller circuit, a game console circuit, a microprocessor, a microcontroller, and memory.

In an example, the dies 30-36 may be fabricated using complimentary metal oxide (CMOS) technology and the package substrate may be a printed circuit board (PCB). In other examples, the dies 30-36 may be fabricated using Gallium-Arsenide technology, Silicon-Germanium technology, bi-polar, bi-CMOS, and/or any other type of IC fabrication technique. In such examples, the package substrate 22-28 may be a printed circuit board (PCB), a fiberglass board, a plastic board, and/or some other non-conductive material board. Note that if the antenna structure is on the die, the package substrate may simply function as a supporting structure for the die and contain little or no traces.

In another example, the transceiver circuits 46-52 provide local wireless communication (e.g., circuit to circuit communication) and/or remote wireless communications (e.g., to/from the device to another device). In this example, when a functional circuit of one circuit has information (e.g., data, operational instructions, files, etc.) to communication to another functional circuit of another circuit or to another device, the transceiver circuit of the first circuit conveys the information via a wireless path to the transceiver circuit of the second circuit or to the other device. In this manner, some to all of the circuit-to-circuit and device-to-device communications may be done wirelessly.

For example, a baseband processing module of a circuit 14-20 converts outbound data (e.g., data, operational instructions, files, etc.) into an outbound symbol stream. The conversion of outbound data into an outbound symbol stream may be done in accordance with one or more data modulation schemes, such as amplitude modulation (AM), frequency modulation (FM), phase modulation (PM), amplitude shift keying (ASK), phase shift keying (PSK), quadrature PSK (QPSK), 8-PSK, frequency shift keying (FSK), minimum shift keying (MSK), Gaussian MSK (GMSK), quadrature amplitude modulation (QAM), a combination thereof, and/or alterations thereof. For example, the conversion of the outbound data into the outbound system stream may include one or more of scrambling, encoding, puncturing, interleaving, constellation mapping, modulation, frequency to time domain conversion, space-time block encoding, space-frequency block encoding, beamforming, and digital baseband to IF conversion.

The transceiver circuit of the circuit 14-20 converts the outbound symbol stream into an outbound RF signal. The antenna structure of circuit is coupled to the transceiver circuit and transmits the outbound RF signal, which has a carrier frequency within a frequency band (e.g., 900 MHz, 1800 MHz, 1900 MHz, 2.4 GHz, 5.5. GHz, 55 GHz to 64 GHz, etc.). Accordingly, the antenna structure includes electromagnetic properties to operate within the frequency band. For example, the length of the antenna structure may be ¼ or ½ wavelength, have a desired bandwidth, have a desired impedance, have a desired gain, etc.

For incoming wireless communications, the antenna structure of the circuit 14-20 receives the RF signal as an inbound RF signal and provides it to the transceiver circuit. The transceiver circuit converts the inbound RF signal into an inbound symbol stream and provides the inbound symbol stream to a baseband processing module of the second IC. The baseband processing module of the circuit 14-20 converts the inbound symbol stream into inbound data in accordance with one or more data modulation schemes, such as amplitude modulation (AM), frequency modulation (FM), phase modulation (PM), amplitude shift keying (ASK), phase shift keying (PSK), quadrature PSK (QSK), 8-PSK, frequency shift keying (FSK), minimum shift keying (MSK), Gaussian MSK (GMSK), quadrature amplitude modulation (QAM), a combination thereof, and/or alterations thereof. For example, the conversion of the inbound system stream into the inbound data may include one or more of descrambling, decoding, depuncturing, deinterleaving, constellation demapping, demodulation, time to frequency domain conversion, space-time block decoding, space-frequency block decoding, de-beamforming, and IF to digital baseband conversion. Note that when the circuit is implemented as an IC, the baseband processing modules of the circuit may be on same die as the transceiver circuit or on a different die within the IC.

In other examples, each circuit 14-20 may include a plurality of transceiver circuits and antenna structures to support multiple input and/or multiple output RF communications using one or more of frequency offset, phase offset, waveguides (e.g., use waveguides to contain a majority of the RF energy), frequency reuse patterns, frequency division multiplexing, time division multiplexing, null-peak multiple path fading (e.g., ICs in nulls to attenuate signal strength and ICs in peaks to accentuate signal strength), frequency hopping, spread spectrum, space-time offsets, and space-frequency offsets. Note that the device 10 is shown to include four circuits 14-20 for ease of illustrate, but may include more or less than four circuits in practical implementations.

As an example, device 10 may be a dongle transceiver that includes a substrate (e.g., 12), a transceiver circuit (e.g., 46), a transmit/receive switch, a MIMO antenna structure (e.g., 38), and a decoupling module. In this example, the transceiver circuit is on at least one of the first and second sides of the substrate and is coupled to the transmit/receive switch. The MIMO antenna structure is on at least one of the first and second sides of the substrate and is coupled to the transmit/receive switch by the decoupling module. In addition, the decoupling module electrically isolates antennas of the MIMO antenna structure.

Figure 2:
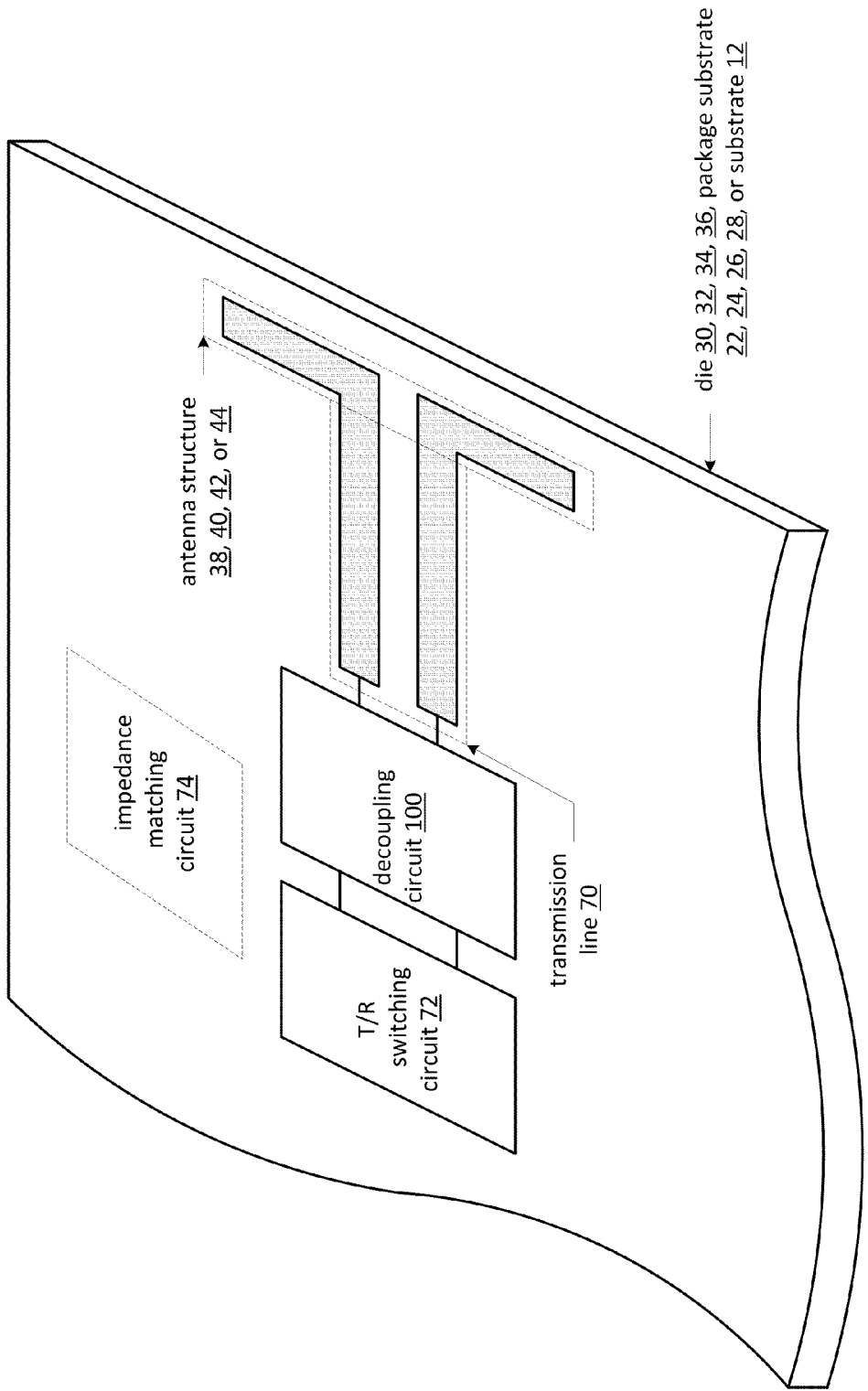
FIG. 2 is a diagram of an embodiment of an antenna apparatus in accordance with the present invention.

FIG. 2 is a diagram of an embodiment of an antenna assembly 38-44 that is coupled to a transmit/receive switching circuit 72, where the antenna assembly 38-44 is on a die 30-36, a package substrate 22-28, and/or the substrate 12. The antenna assembly includes an antenna structure 38-44 (which includes two or more antennas that may be used for MIMO communications) and a decoupling module 100. Each of the antennas of the antenna structure 38-40 may be a half-wavelength dipole antenna, a quarter-wavelength monopole antenna, an antenna of an antenna array, a multiple input multiple output (MIMO) antenna, and/or a microstrip patch antenna.

The T/R switching circuit 72 includes a switch, a transistor, a tri-state buffer, an isolator, a duplexer, a transformer balun, and/or a tri-state driver, to couple the decoupling module 100 to the RF transceiver 46-52. In an example, the switching circuit 72 receives outbound RF signals from the transceiver circuit 46-52 and provides them to the decoupling module 100. In another example, the T/R switching circuit provides inbound RF signals from the decoupling module 100 to the transceiver circuit.

The antenna assembly may further include a transmission line 70 and/or an impedance matching circuit 74. The transmission line 70, which may be a pair of microstrip lines on the die, the package substrate, and/or on the substrate, electrically couples to the antenna structure 38-44 and to the decoupling module 100.

If included, the impedance matching circuit 74 is coupled in series with the decoupling circuit 100. For example, the impedance matching circuit 74 is coupled between the transmit/receive switch 72 and the decoupling module 100. In another example, the impedance matching circuit 74 is coupled between the MIMO antenna structure 38-44 and the decoupling module 100. An embodiment of the impedance matching circuit 74 includes one or more of an adjustable inductor circuit, an adjustable capacitor circuit, an adjustable resistor circuit, an inductor, a capacitor, and a resistor, that in combination with the transmission line 70 and the decoupling module 100, establish a substantially matching impedance to the impedance of the antenna structure 38-44.

As an example implementation of an antenna assembly, the substrate includes a first side and a second side. The Multiple Input Multiple Output (MIMO) antenna structure is implemented on at least one of the first and second sides of the substrate. (See FIGS. 10-12 for examples). The decoupling module is implemented on at least one of the first and second sides of the substrate, couples the MIMO antenna structure to transmit/receive switch, and electrically isolates antennas of the MIMO antenna structure.

Figure 3:
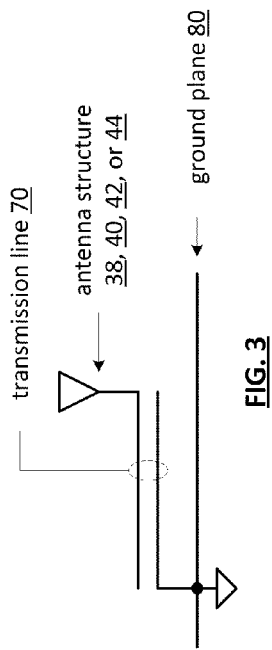
FIG. 3 is a schematic block diagram of an embodiment of antenna in accordance with the present invention.

FIG. 3 is a schematic diagram of an antenna structure 38-44 coupled to the transmission line 70 and a ground plane 80. The antennas of the antenna structure 28-44 may each be a half-wavelength dipole antenna, a quarter-wavelength monopole antenna, an antenna implemented as a trace having a modified Polya curve shape that is confined to a triangular shape, etc. The transmission line 70 includes a first line and a second line, which are substantially parallel. In an example, at least the first line of the transmission line 70 is electrically coupled to the antenna structure 38-44.

The ground plane 80 has a surface area larger than the surface area of the antenna structure 38-44 and may be on the both sides of the substrate. For example, The ground plane 80, from a first axial perspective, is substantially parallel to the antenna structure 38-44 and, from a second axial perspective, is substantially co-located and/or co-planer to the antenna structure 38-44.

Figure 4:
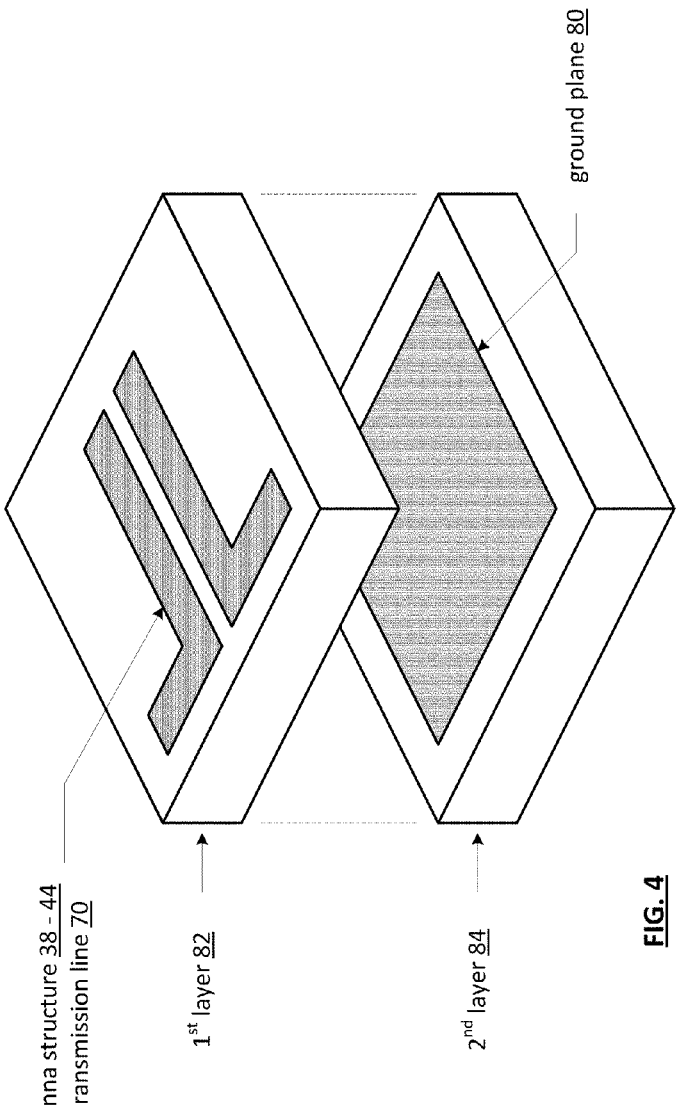
FIG. 4 is a diagram of another embodiment of an antenna apparatus in accordance with the present invention.

FIG. 4 is a diagram of an embodiment of an antenna structure 38-44 on a die 30-36, a package substrate 22-28, and/or the substrate 12. The antenna structure 38-44 includes two or more antennas, the antenna ground plane 80, and the transmission line 70. In this embodiment, the antennas and the transmission line 70 are on a first layer 82 (or first side) of the die, the package substrate, and/or the device substrate 12, and the ground plane 80 is on a second layer 84 (or second side) of the die, the package substrate, and/or the device substrate 12.

Figure 5:
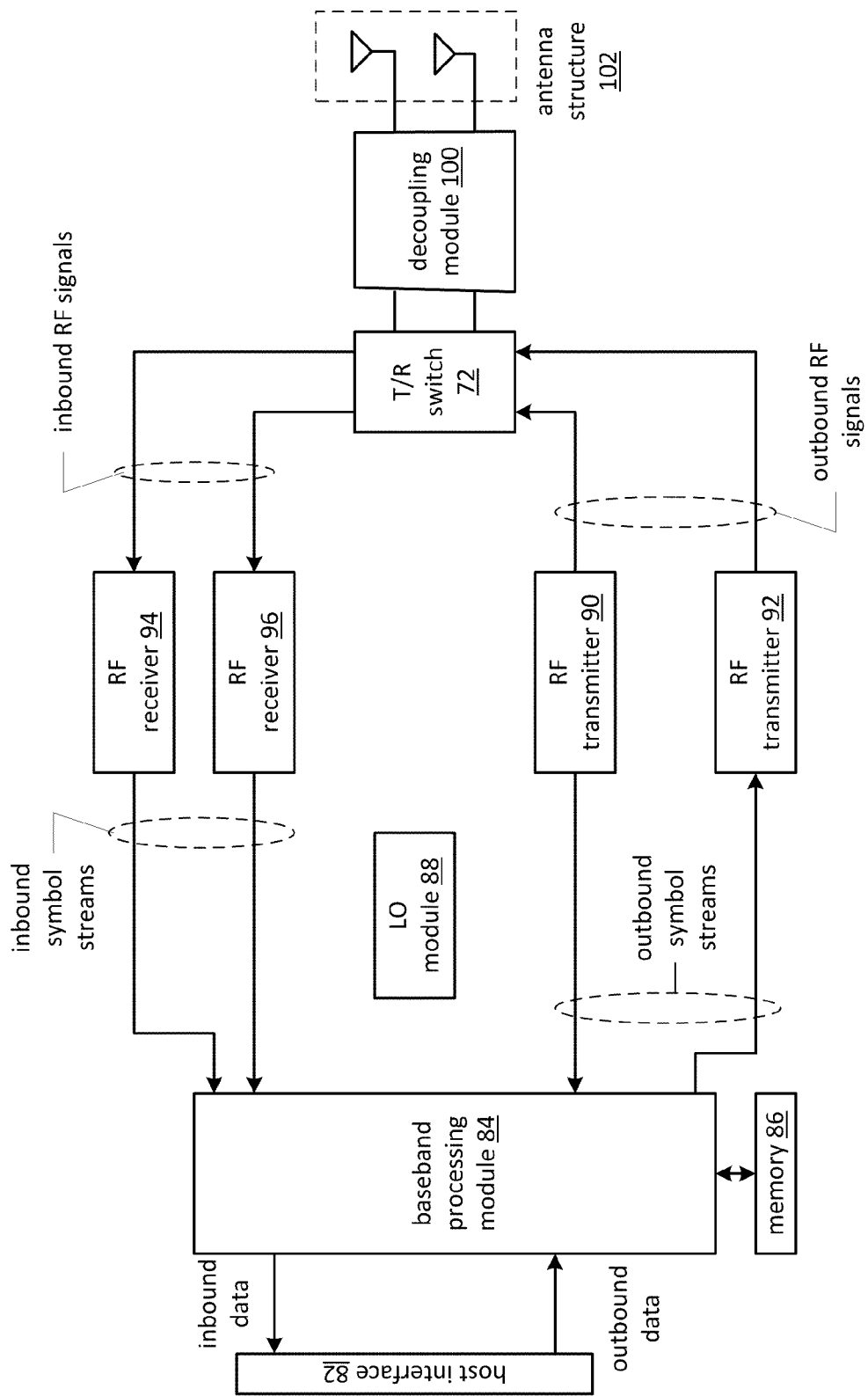
FIG. 5 is a schematic block diagram of an embodiment of a transceiver in accordance with the present invention.

FIG. 5 is a diagram of a transceiver that includes a host interface 82, a baseband processing module 84, memory 86, a plurality of radio frequency (RF) transmitters 90-92, a transmit/receive (T/R) circuit 72, a decoupling module 100, an antenna structure 102, a plurality of RF receivers 94-96, and a local oscillation module 88. The baseband processing module 84, in combination with operational instructions stored in memory 86, executes digital receiver functions and digital transmitter functions, respectively. The digital receiver functions include, but are not limited to, digital intermediate frequency to baseband conversion, demodulation, constellation demapping, decoding, de-interleaving, fast Fourier transform, cyclic prefix removal, space and time decoding, and/or descrambling. The digital transmitter functions include, but are not limited to, scrambling, encoding, interleaving, constellation mapping, modulation, inverse fast Fourier transform, cyclic prefix addition, space and time encoding, and digital baseband to IF conversion. The baseband processing modules may be implemented using one or more processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory may be a single memory device or a plurality of memory devices. Such a memory device may be a read-only memory, random access memory, volatile memory, non-volatile memory, static memory, dynamic memory, flash memory, and/or any device that stores digital information. Note that when the processing module 100 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the transceiver receives outbound data 104 from a host device via the host interface 82. The baseband processing module 84 receives the outbound data 104 and produces, therefrom, one or more outbound symbol streams 106. This may be cone in accordance with a particular mode of operation that is compliant with one or more specific modes of the various IEEE 802.11 standards. For example, the mode may indicate a frequency band of 2.4 GHz, a channel separation of 20 or 25 MHz and a maximum bit rate of 54 megabits-per-second. In this general category, the mode may further indicate a particular rate ranging from 1 megabit-per-second to 54 megabits-per-second and beyond. In addition, the mode selection signal will indicate a particular type of modulation, which includes, but is not limited to, direct sequence spread spectrum (DSSS) using Barker Code Modulation, BPSK, QPSK, complimentary code keying (CCK), 16 QAM and/or 64 QAM. The mode may also include a code rate, a number of coded bits per subcarrier (NBPSC), coded bits per OFDM symbol (NCBPS), and/or data bits per OFDM symbol (NDBPS). The mode may also indicate a particular channelization for the corresponding mode that provides a channel number and corresponding center frequency. The mode may further indicate a power spectral density mask (e.g., bandwidth) value and a number of antennas to be initially used for a MIMO communication.

The baseband processing module 84, based on the mode, produces one or more outbound symbol streams 106 from the outbound data 104. For example, if the mode indicates that a single transmit antenna is being utilized for the particular mode that has been selected, the baseband processing module produces a single outbound symbol stream 104. Alternatively, if the mode indicates 2, 3 or 4 antennas (e.g., a MIMO transmission), the baseband processing module produces 2, 3 or 4 outbound symbol streams from the outbound data.

Depending on the number of outbound streams produced by the baseband module, a corresponding number of the RF transmitters 90-92 are enabled to convert the outbound symbol streams into outbound RF signals 108. In general, each of the RF transmitters includes a digital filter and upsampling module, a digital to analog conversion module, an analog filter module, a frequency up conversion module, a power amplifier, and a radio frequency bandpass filter. The RF transmitters 90-92 provide the outbound RF signals 108 to the transmit/receive module 72, which provides the outbound RF signals to the decoupling module 100 and, in turn, to the antennas of the antenna structure 102.

When the transceiver is in the receive mode, the transmit/receive circuit 72 receives one or more inbound RF signals 110 via the antennas of the antenna structure 102 and the decoupling module 100. The T/R switch circuit 72 provides the inbound RF signals 110 to one or more RF receivers 94-96. The RF receivers 94-96 convert the inbound RF signals into a corresponding number of inbound symbol streams 112. The number of inbound symbol streams 112 corresponds to the particular mode in which the data was received. The baseband processing module 84 converts the inbound symbol streams 112 into inbound data 114.

The antennas of the antenna structure are of a small form factor to provide high isolation between the antennas and may be fabricated to physically conform to a WLAN MIMO USB dongle. The decoupling module 100 provides isolation between ports of up to 30 dB, or more, with a 10 dB return loss to support a broad bandwidth (e.g., 2390 MHz-2580 MHz for a monopole application and 2400 MHz-2520 MHz for a dipole application). In addition, the decoupling module provides a peak gain of about −1.6 dBi for a monopole application and −2.5 dBi for a dipole application. Further, the decoupling module 100 can be tuned to provide a desired input and/or output impedance within a given frequency range (e.g., 2.4 GHz, 5 GHz, 60 GHz, etc.).

Figure 6:
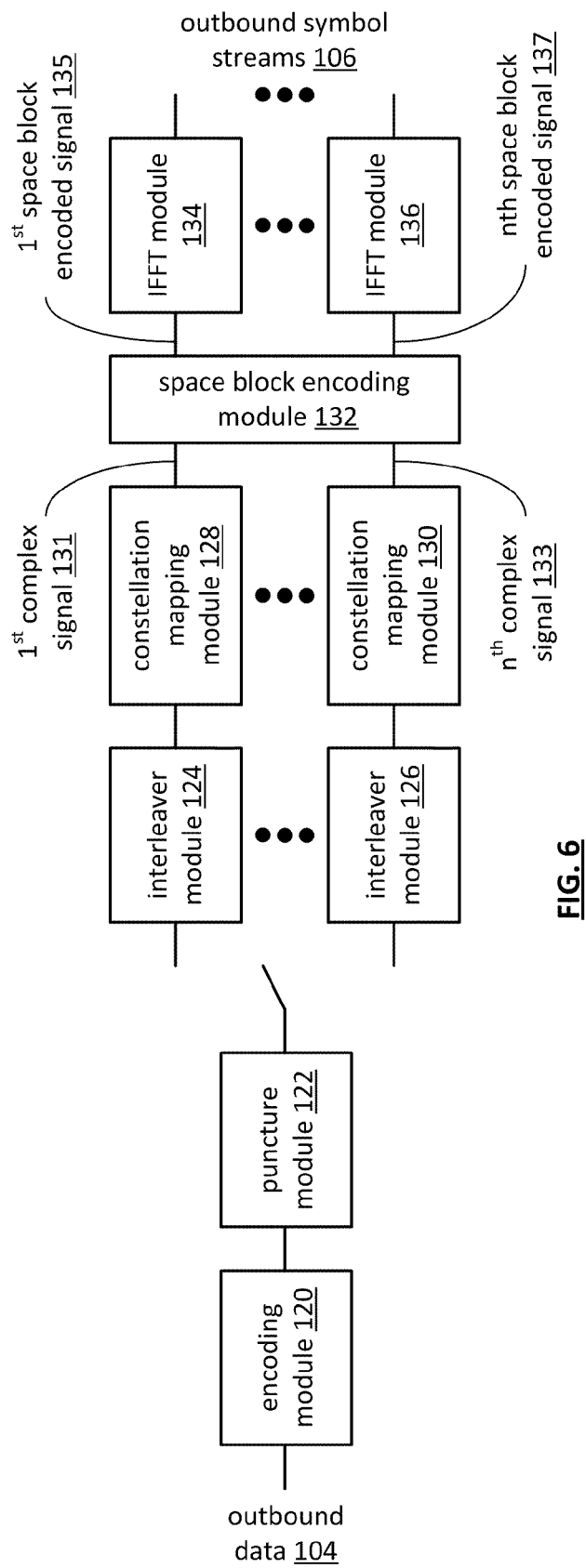
FIG. 6 is a schematic block diagram of an embodiment of the transmit-side baseband processing in accordance with the present invention.

FIG. 6 is a functional schematic block diagram of baseband transmit processing 100-TX within the baseband processing module 84, which includes an encoding module 120, a puncture module 122, a switch, an interleaving module, which may include a plurality of interleaver modules 124, 126 or an interleaver and a switching module, a plurality of constellation encoding modules 128, 130 (which outputs complex signals 131-133), a space-time and/or space-frequency block encoding module 132 (which outputs space block encoded signals 135-136), and a plurality of inverse fast Fourier transform (IFFT) modules 134, 136 for converting the outbound data 94 into the outbound symbol streams 106. As an example, the baseband transmit processing may include two or more of each of the interleaver modules 124, 126, the constellation mapping modules 128, 130, and the IFFT modules 134, 136 depending on the number of transmit paths. As another example, the encoding module 122, puncture module 122, the interleaver modules 124, 126, the constellation mapping modules 128, 130, and the IFFT modules 134, 136 function in accordance with one or more wireless communication standards including, but not limited to, IEEE 802.11a, b, g, n.

In an example of operation, the encoding module 120 is operably coupled to convert outbound data 104 into encoded data in accordance with one or more wireless communication standards. The puncture module 122 punctures the encoded data to produce punctured encoded data. The plurality of interleaver modules 124, 126 is operably coupled to interleave the punctured encoded data into a plurality of interleaved streams of data. The plurality of constellation mapping modules 128, 130 is operably coupled to map the plurality of interleaved streams of data into a plurality of streams of data symbols, wherein each data symbol of the stream of data symbols includes one or more complex signals 131-133. The space-time and/or space-frequency block encoding module 132 is operably coupled to encode a plurality of complex signals 131, 133 (e.g., at least two complex signals) into a plurality of space-time and/or space-frequency block encoded signals 135-137. The plurality of IFFT modules 124, 136 is operably coupled to convert the plurality of space-time and/or space-frequency block encoded signals 135-137 into a plurality of outbound symbol streams 106.

Figure 7:
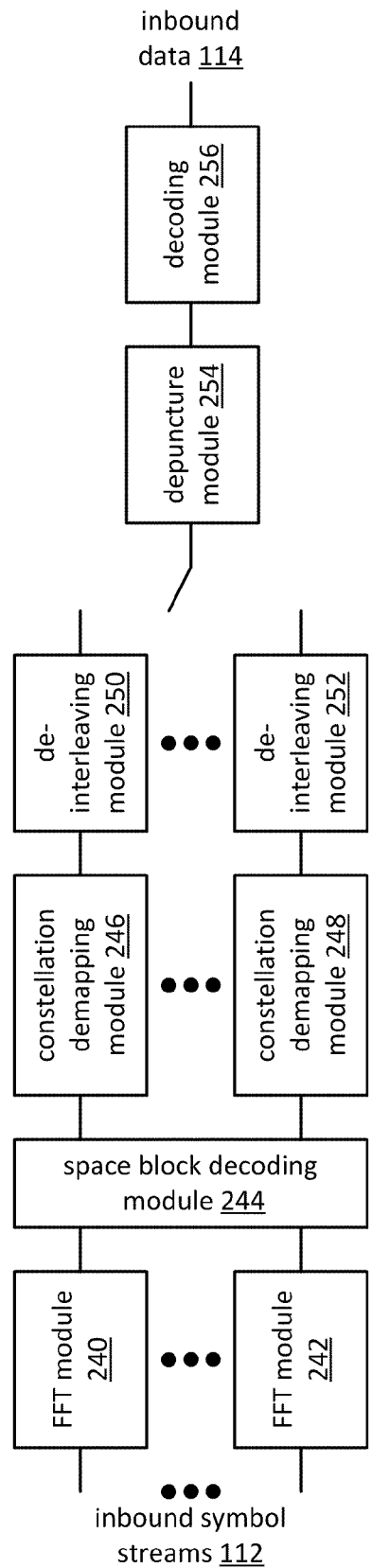
FIG. 7 is a schematic block diagram of an embodiment of the receive-side baseband processing in accordance with the present invention.

FIG. 7 is a schematic block diagram of baseband receive processing 100-RX that includes a plurality of fast Fourier transform (FFT) modules 240, 242, a space-time and/or space-frequency block decoding module 244, a plurality of constellation demapping modules 246, 248, a plurality of deinterleaving modules 250, 252, a switch, a depuncture module 254, and a decoding module 256 for converting a plurality of inbound symbol streams 114 into inbound data 116. In an example, the baseband receive processing 100-RX includes two or more of each of the deinterleaving modules 250, 252, the constellation demapping modules 246, 248, and the FFT modules 240, 242. In another example, the decoding module 256, depuncture module 254, the deinterleaving modules 250, 252, the constellation decoding modules 246, 248, and the FFT modules 240, 242 function in accordance with one or more wireless communication standards including, but not limited to, IEEE 802.11a, b, g, n.

In an example of operation, a plurality of FFT modules 240, 242 is operably coupled to convert a plurality of inbound symbol streams 114 into a plurality of streams of space-time and/or space-frequency block encoded symbols. The space-time and/or space-frequency block decoding module 244 is operably coupled to decode the plurality of streams of space-time and/or space-frequency block encoded symbols into a plurality of streams of data symbols. For instance, the space-time and/or space-frequency block decoding module 244 performs an inverse function of the space-time and/or space-frequency block coding module 132 of FIG. 6. The plurality of constellation demapping modules is operably coupled to demap the plurality of streams of data symbols into a plurality of interleaved streams of data. The plurality of deinterleaving modules is operably coupled to deinterleave the plurality of interleaved streams of data into encoded data. The decoding module is operably coupled to convert the encoded data into inbound data 112.

Figure 8:
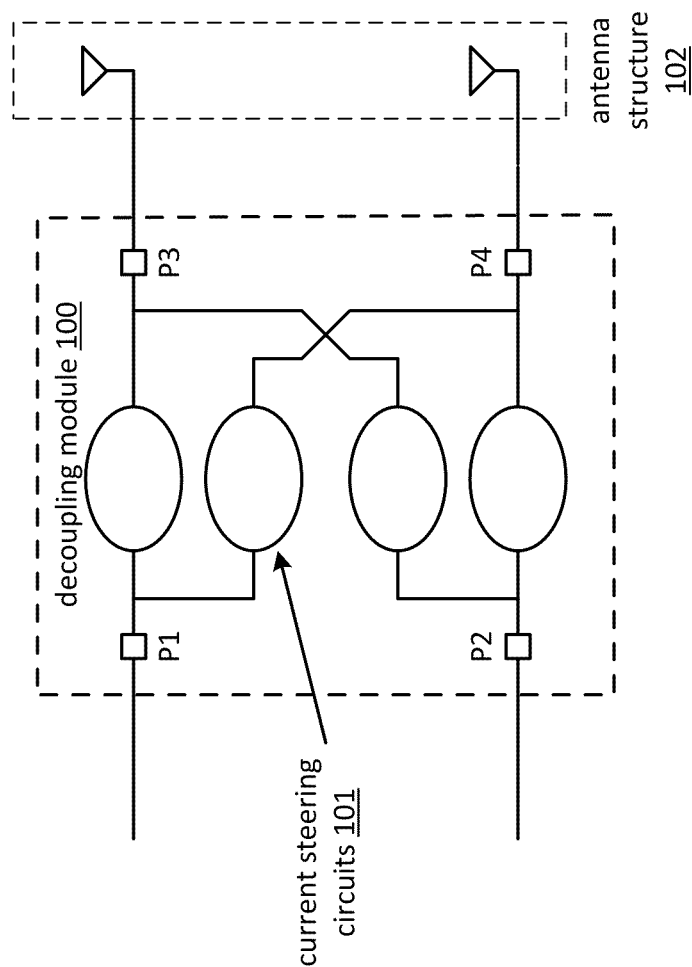
FIG. 8 is a schematic block diagram of an embodiment of a decoupling module in accordance with the present invention.

FIG. 8 is a schematic block diagram of another embodiment of a decoupling module 100 coupled to an antenna structure 102. The decoupling module 100 includes a plurality of transceiver ports (P1-P2), a plurality of antenna ports (P3-P4), and a plurality of current steering circuits. The antenna structure 102 includes a plurality of antennas. For example, the antenna structure 102 includes first and second monopole antennas. As another example, the antenna structure 102 includes a monopole antenna and a dipole antenna.

The antenna ports (which may be an electrical connector, a wire connection, a circuit node, or other electro-mechanical coupler) are operable for coupling to the antennas of the MIMO antenna structure. The transceiver ports (which may be an electrical connector, a wire connection, a circuit node, or other electro-mechanical coupler) are operable for coupling to corresponding ports of the transmit/receive switch (e.g., as shown in FIGS. 2,5, and/or 9).

The current steering circuits steer phase-shifted currents and non-phase shifted currents between the plurality of antenna ports and the plurality of transceiver ports to couple the antennas of the MIMO antenna structure and the transmit/receive switch and to isolate signals transmitted or received by the antennas of the MIMO antenna structure. For example, the current steering circuits may be uni-directional (e.g., for transmit signals or for receive signals) and/or may be bi-directional (e.g., both transmit and receive signals). As a further example, the current steering circuits may include capacitors, inductors, transistors, diodes, and/or other analog circuits that collectively steer current in a desired direction at a desired level to effectively provide isolation between the ports. For instance, the current steering circuits may function as integrators and/or differentiates to achieve a phase shift between the signals on different antennas to achieve isolation between the signals.

Figure 9:
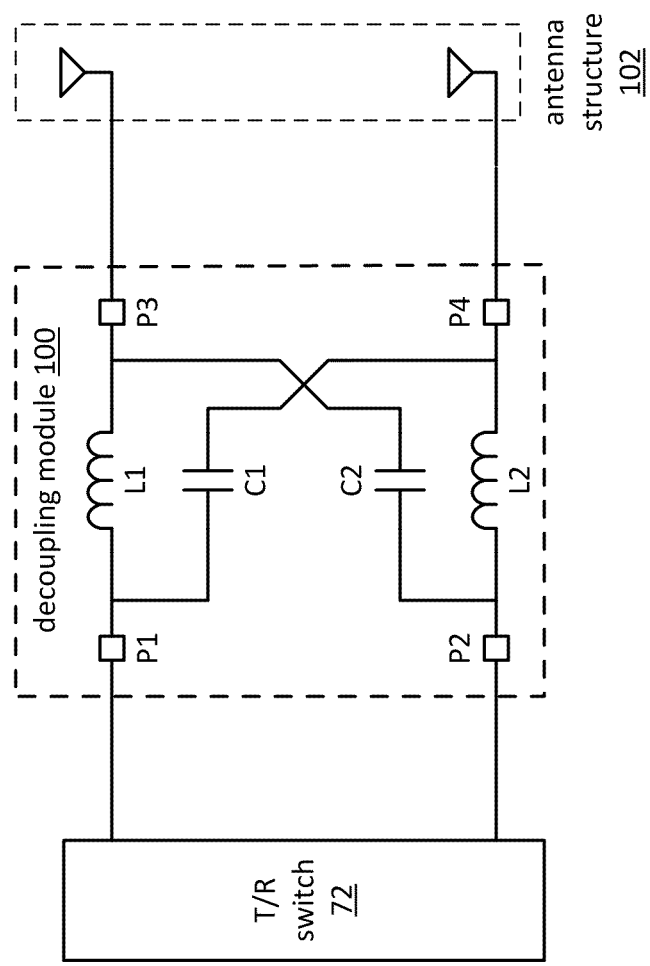
FIG. 9 is a schematic block diagram of another embodiment of a decoupling module in accordance with the present invention.

FIG. 9 is a schematic block diagram of an embodiment of a decoupling module 100 that includes four ports (P1-P4), a pair of capacitors (C1, C2), and a pair of inductors (L1, L2). The capacitors may be fixed capacitors or variable capacitors to enable tuning. The inductors may be fixed inductors or variable inductors to enable tuning. In an example, the capacitance of the capacitors and the inductance of the inductors are selected to provide a desired level of isolation between the ports and a desired impedance within a given frequency range, which yield a desired return loss.

As a more specific example, assume a 2×2 MIMO antenna structure, where the L-C circuit of the decoupling module provides one or more integrators and/or one or more differentiators within a desired frequency band (e.g., 2.4 GHz, 5 GHz, 60 GHz, etc.). Further assume that a first signal on a first antenna is (sin a(t)) and a second signal on the second antenna is (cos a(t)). The integral of sin a(t) is −1/a cos a(t), the integral of cos a(t) is 1/a sin a(t), the derivative of sin a(t) is cos a(t), and the derivative of cos a(t) is −sin a(t). Through the cross coupling of the ports, the mathematical properties of sinusoidal signals, and the L-C circuit, the ports have electrical isolation of 30 dB or more by substantially reducing the reflected energy and/or the radiated energy of the other antenna. In addition, the decoupling module provides a return loss of approximately 10 dB, which facilitates broad bandwidth applications (e.g., 2390 MHz-2580 MHz for a monopole application and 2400 MHz-2520 MHz for a dipole application).

Figure 10:
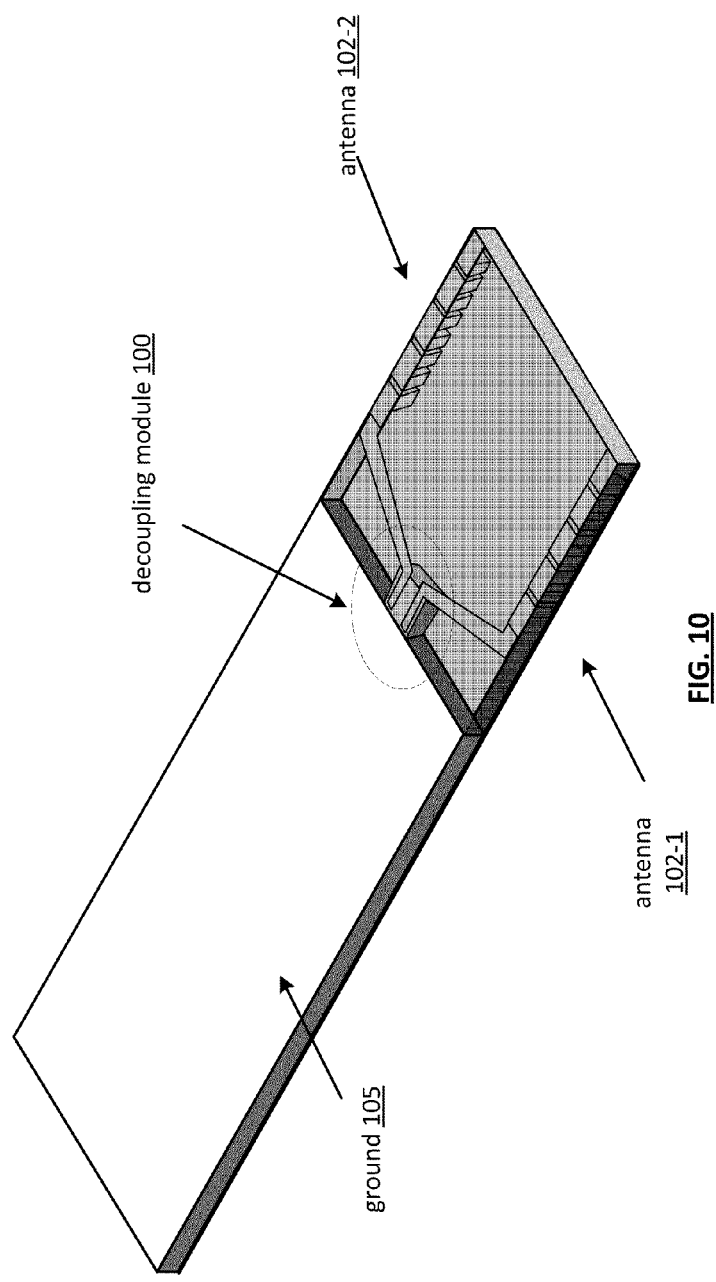
FIG. 10 is a diagram of an embodiment of a dongle having an antenna structure in accordance with the present invention.

FIG. 10 is a diagram of an embodiment of a dongle transceiver that includes a substrate, a transceiver circuit (not shown), a transmit/receive switch (not shown), and an antenna assembly that includes a decoupling module 100 and an antenna structure 102, which includes a plurality of antennas 102-1 & 102-2 (two antennas are shown in this illustration). As shown, the antennas are physically separated and are at opposite edges of the substrate (e.g., a printed circuit board). For example, the printed circuit board may be an FR4 substrate that has a size of 20 mm×68 mm with a thickness of 1 mm. The radiator portion of the antenna structure may be 20 mm×18 mm such that the distance between the antennas is about 20 mm.

Figure 11:
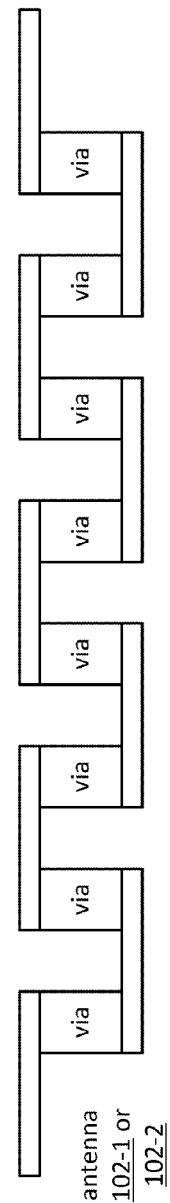
FIG. 11 is a diagram of an embodiment of an antenna in accordance with the present invention.

In this embodiment, each of the antennas is a monopole antenna. The first monopole antenna 102-1 is formed along a first edge of the substrate and includes first antenna elements on the first side of the substrate, second antenna elements on the second side of the substrate, and a plurality of vias to linearly connect the first antenna elements to the second antenna elements to produce series connected antenna elements. The first monopole antenna further includes a connection element that connects the series connected antenna elements to a first antenna port of the decoupling module 100. FIG. 11 provides an example of series connected antenna elements.

The second monopole antenna 102-2 is formed along a second edge of the substrate and includes third antenna elements on the first side of the substrate, fourth antenna elements on the second side of the substrate, and a plurality of vias to linearly connect the third antenna elements to the fourth antenna elements to produce a series connected antenna elements. The second monopole antenna 102-2 further includes a connection element that connects the series connected antenna elements and to a second antenna port of the decoupling module 100.

The substrate may further include first and second ground planes. The first ground plane is on the first side of the substrate and is at a first end of the substrate. The second ground plane is on the second side of the substrate and is at the first end of the substrate. In this configuration, the MIMO antenna structure and the decoupling module 100 are on a second end of the substrate.

FIG. 11 is a diagram of an embodiment of the series connected antenna elements of an antenna 102-1 or 102-2 that includes a plurality of metal traces coupled together by a plurality of vias. In this manner of effective length of the antenna exceeds the geometric area of the antenna. Note that the metal traces may be micro strips, coils, and/or meandering traces.

Figure 12:
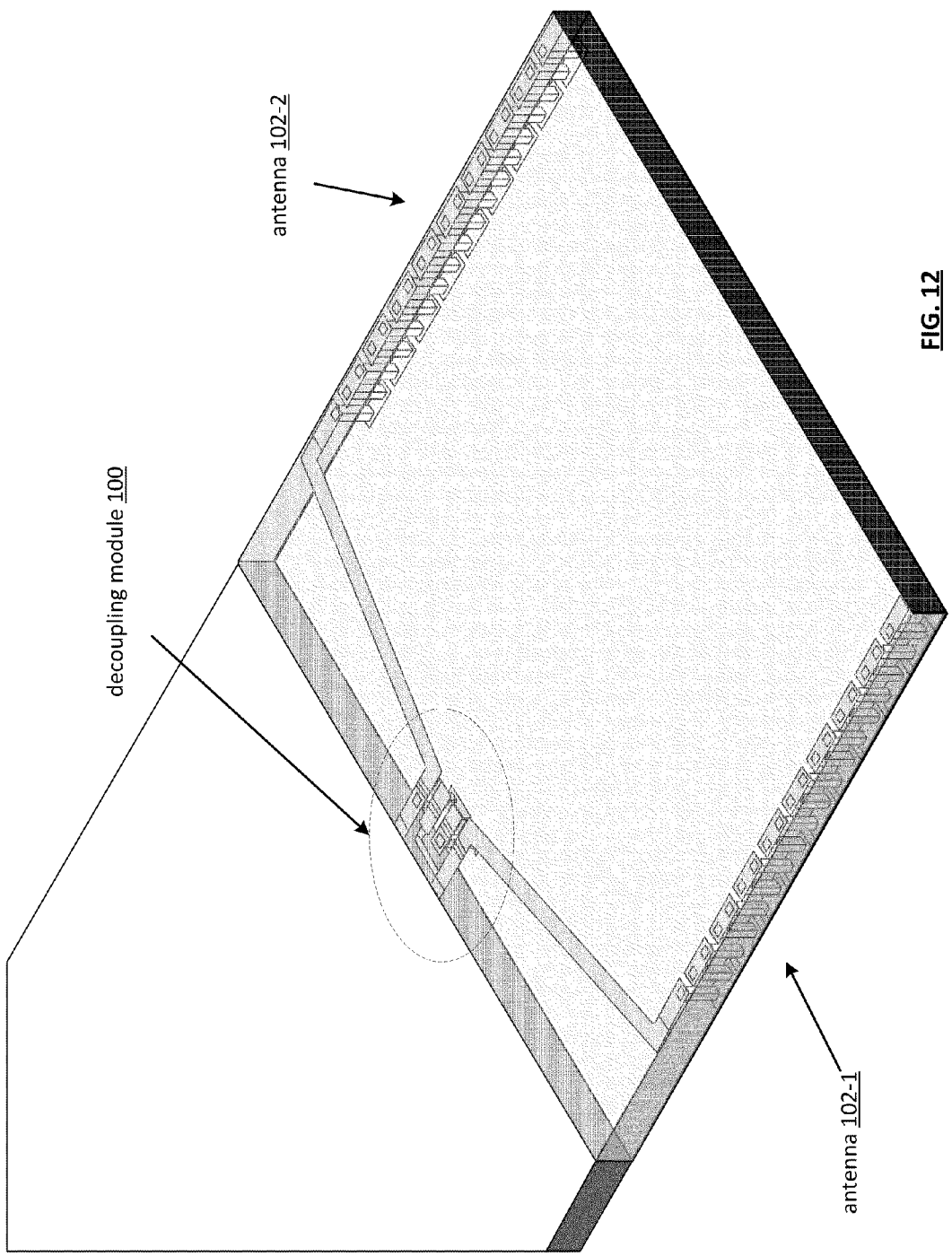
FIG. 12 is a diagram of an embodiment of an antenna structure and decoupling module in accordance with the present invention.

FIG. 12 is a close up diagram of an embodiment of the antennas 102-1 & 102-2 of the antenna structure coupled to the decoupling module 100. As shown, the antennas are physically separated and are at opposite edges of a printed circuit board (i.e., the substrate).

Figure 13:
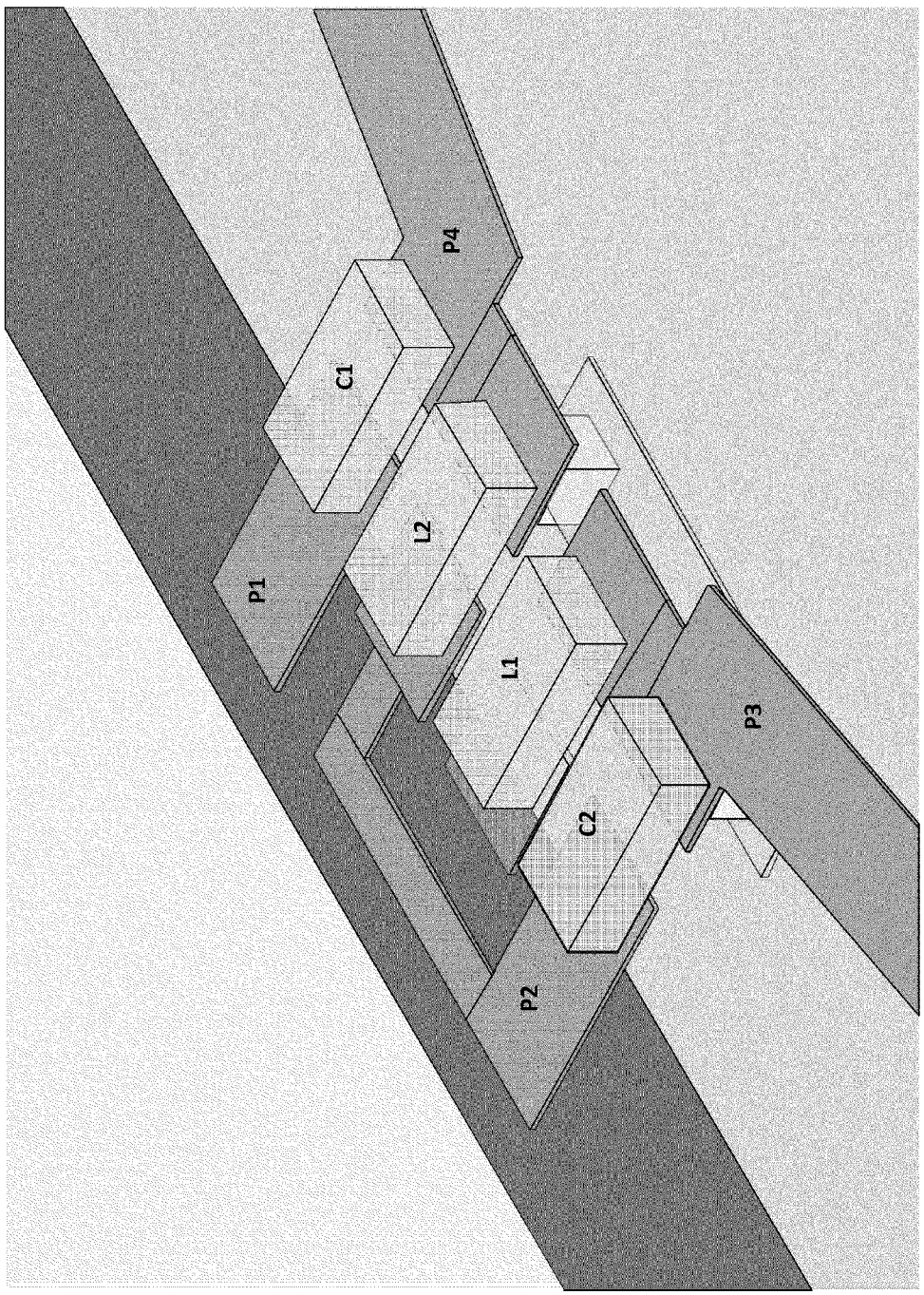
FIG. 13 is a diagram of an embodiment of a decoupling module in accordance with the present invention.

FIG. 13 is a diagram of an embodiment of a decoupling module 100 that includes four ports (P1-P4), a pair of capacitors (C1, C2), and a pair of inductors (L1, L2). The traces on the printed circuit board are such to provide the inter-coupling between the ports, capacitors, and inductors. In this diagram, port 3 is coupled to one of the antennas (e.g., 102-1) and port 4 is coupled to the other antenna (e.g., 102-2). Note that the antennas may be used as separate monopole antennas and/or as legs of a dipole antenna. Thus, in a MIMO setting, the antennas would be used as separate monopole antennas and, in a SISO setting, the antennas could be used as a dipole antenna.

Figure 14:
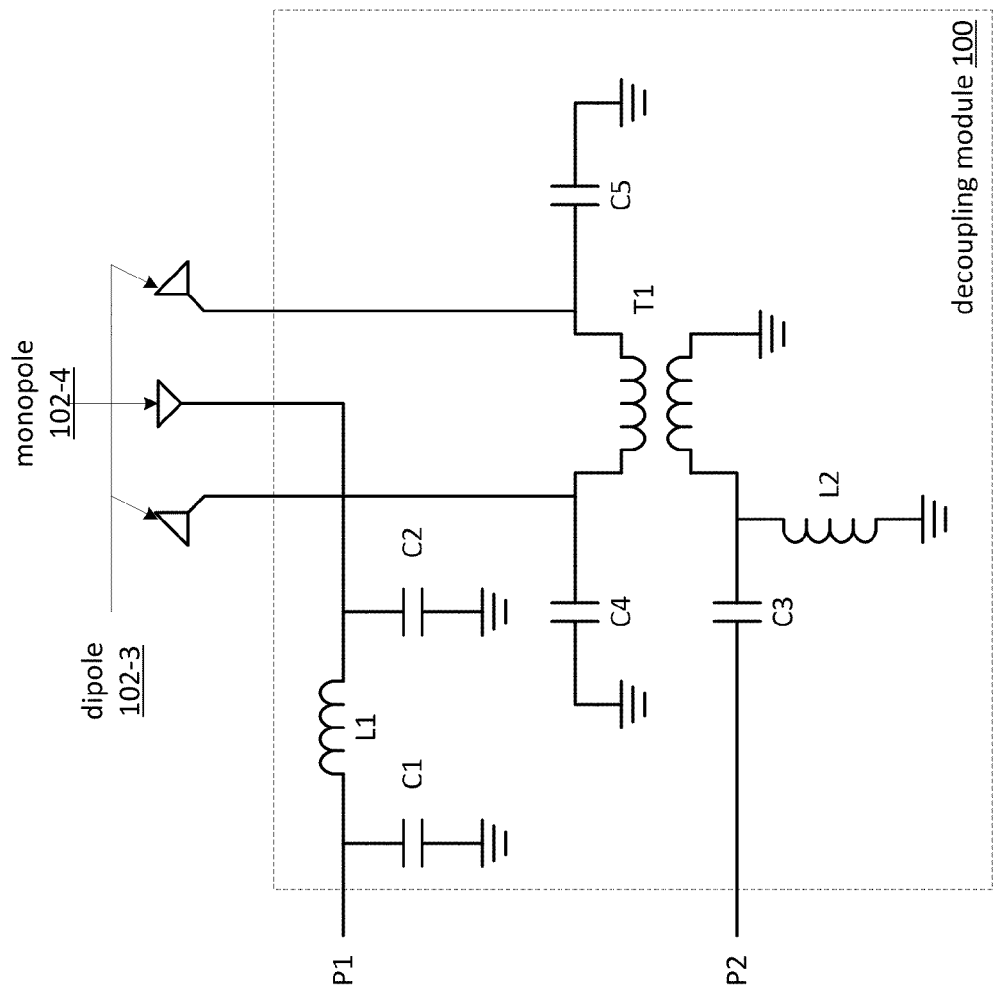
FIG. 14 is a schematic block diagram of an embodiment of a decoupling module coupled to an antenna structure in accordance with the present invention.

FIG. 14 is a schematic block diagram of an antenna assembly that includes two antennas (e.g., a monopole antenna 102-4 and a dipole antenna 102-3) and a decoupling module 100 (e.g., coupling for each antenna and isolation between each antenna). The decoupling module 100 includes a first section and a second section. The first section includes a first port (P1), an inductor (L1), a pair of capacitors (C1 and C2), and an antenna port, and provides isolation, impedance matching, and/or return loss with respect to the monopole antenna 102-4. The second section includes a second port (P2), an inductor (L2), a transformer (T1), three capacitors (C3-05), and two antenna ports, and provides isolation, impedance matching, and/or return loss with respect to the dipole antenna 102-3.

The first section provides a tank circuit that is tuned to the frequency band of the first antenna (e.g., the monopole antenna). For example, if the antenna structure is for a 2.4 GHz transceiver, the first section is tuned to the 2.4 GHz range. As such, the tuned tank circuit provides isolation, impedance matching, and/or return loss with respect to the monopole antenna 102-4.

The second section provides a tank circuit and a single-ended to differential conversion. The transformer and capacitors C4 and C5 provide the single-ended to differential conversion. The tank circuit is tuned to operating frequency of the second antenna (e.g., the dipole antenna). As such, the tuned tank circuit provides isolation, impedance matching, and/or return loss with respect to the dipole antenna 102-3.

Figure 15:
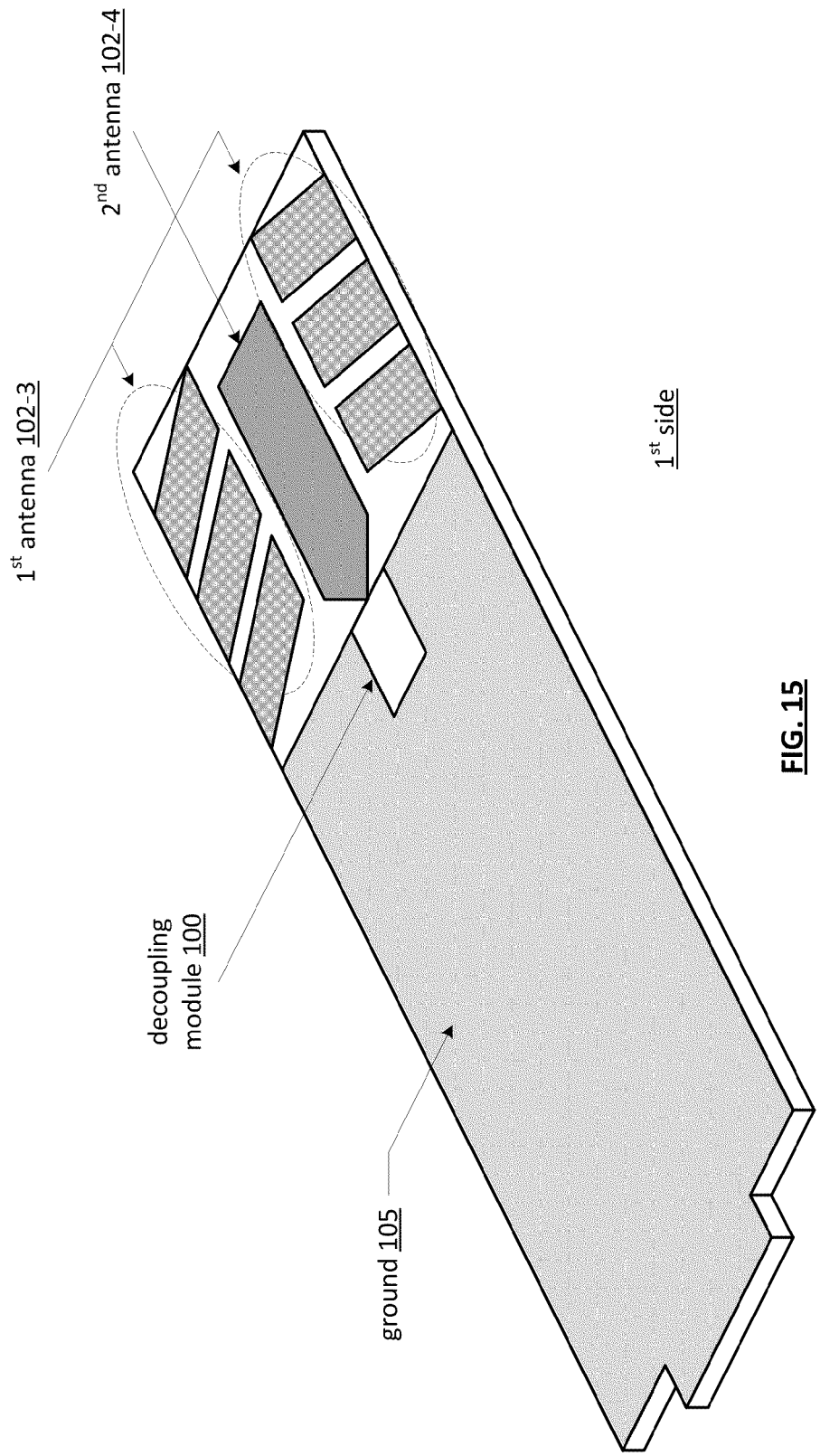
FIG. 15 is a block diagram of an embodiment of a first side of a dongle having a multiple antenna structure in accordance with the present invention.

FIG. 15 is a block diagram of one side of an embodiment of a multiple antenna transceiver dongle device that includes a substrate 40 (e.g., PCB, IC, etc.), a dipole antenna 103 as the first antenna, a monopole antenna 101 as the second antenna, and a decoupling module 100. The dipole antenna 103 has a near-zero electric field plane in which the monopole antenna 101 is positioned. In this regard, the monopole antenna 101 is isolated (e.g., >20 dB) from the dipole antenna 103, which is further improved by the decoupling module 100 of FIG. 14.

The particular construct of the dipole antenna 103 and the monopole antenna 101 is dependent on the desired performance requirements of the antennas. The performance requirements include one or more of frequency band, bandwidth, gain, impedance, efficiency, and polarization. For example, if the both antennas are for 60 GHz, communications, the monopole antenna 101 and each segment of the dipole antenna 103 may be a microstrip having a length equivalent to ¼ wavelength (e.g., ¼ ($\lambda$)=c/f, $0.25 * 3 \times 10^8 / 60 \times 10^9$=1.25 mm). As another example, a ¼ wavelength antenna at 900 MHz has a total length of approximately 8.3 centimeters (i.e., $0.25 * (3 \times 10^8$ m/s$)/(900 \times 10^6$ c/s$)$=0.25*33 cm, where m/s is meters per second and c/s is cycles per second). As a further example, a ¼ wavelength antenna at 2400 MHz has a total length of approximately 3.1 cm (i.e., $0.25 * (3 \times 10^8$ m/s$)/(2.4 \times 10^9$ c/s$)$=0.25*12.5 cm). As yet one more example, a ¼ wavelength antenna at 5500 MHz has a total length of approximately 1.36 cm (i.e., $0.25 * (3 \times 10^8$ m/s$)/(5.5 \times 10^9$ c/s$)$=0.25*5.45 cm). Note that the other performance requirements are affected by trace thickness, use of a ground plane, and/or other physical characteristics of the antennas.

As a specific example, the dipole antenna 103 includes a first antenna section and a second antenna section. The first antenna section is formed along a first edge of the substrate and includes first antenna elements on the first side of the substrate, second antenna elements on the second side of the substrate, and a plurality of vias to linearly connect the first antenna elements to the second antenna elements to produce series connected antenna elements. The first antenna section further includes a connection element that connects the series connected antenna elements to a first antenna port of the decoupling module. An example of series connected antenna elements is provided in FIG. 11.

The second antenna section is formed along a second edge of the substrate and includes third antenna elements on the first side of the substrate, fourth antenna elements on the second side of the substrate, and a second plurality of vias to linearly connect the third antenna elements to the fourth antenna elements to produce a second series connected antenna elements. The second antenna element section further includes a second connection element that connects the second series connected antenna elements to a second antenna port of the decoupling module.

The monopole antenna includes a plurality of antenna sections on the first and the second sides of the substrate. The plurality of antenna sections is located between the first and second antenna sections of the dipole antenna.

The dongle device may further include first and second ground planes. The first ground plane is on the first side of the substrate at a first end of the substrate and the second ground plane is on the second side of the substrate at the first end of the substrate. In this configuration, the MIMO antenna structure and the decoupling module are on a second end of the substrate.

Figure 16:
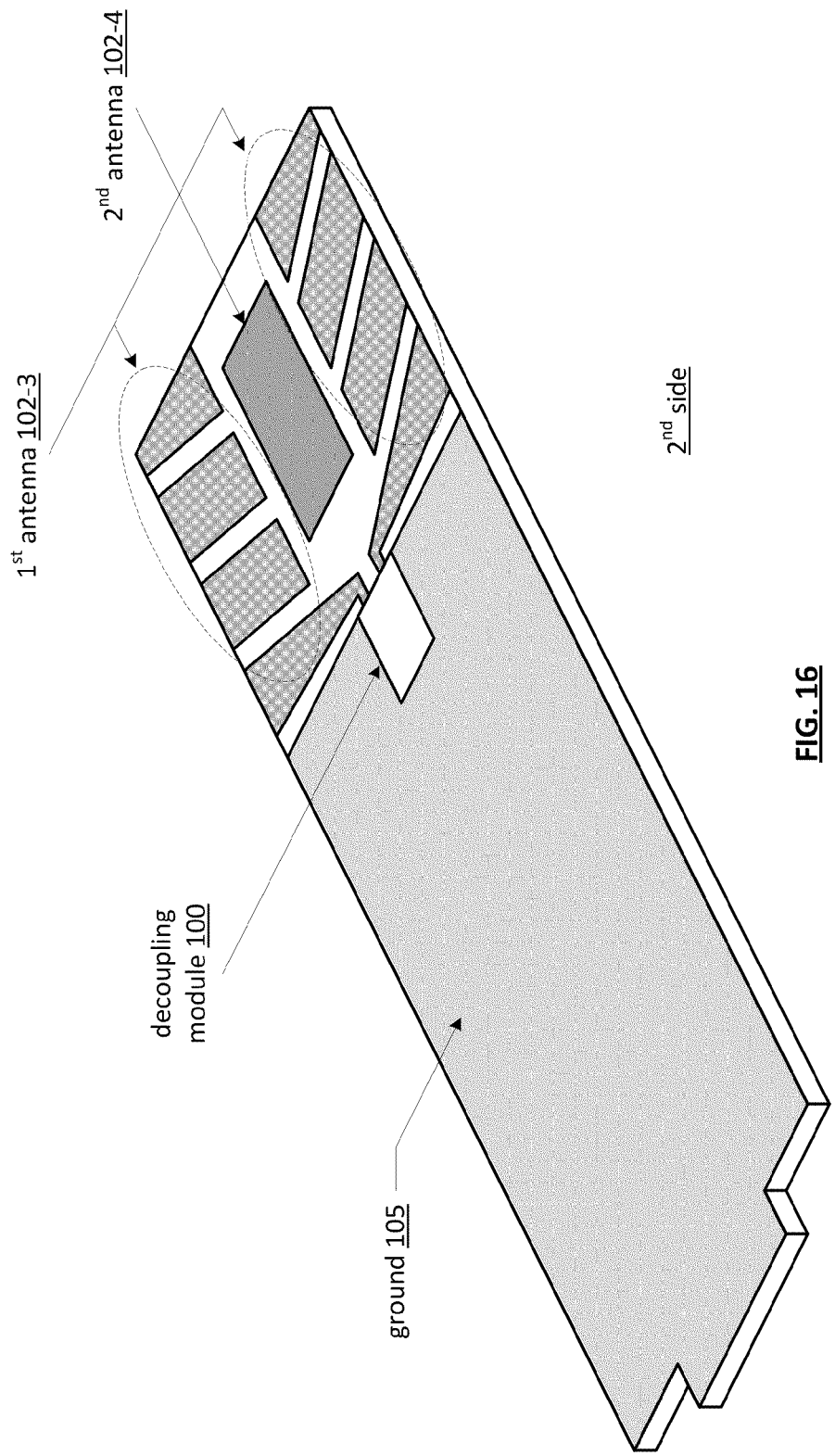
FIG. 16 is a block diagram of an embodiment of a second side of a dongle having a multiple antenna structure in accordance with the present invention.

FIG. 16 is a schematic diagram of a second side of the embodiment of the dongle device of FIG. 15. As shown on this side, the dongle device includes the dipole antenna 103, the monopole antenna 101, and a portion of the decoupling module 100.

Figure 17:
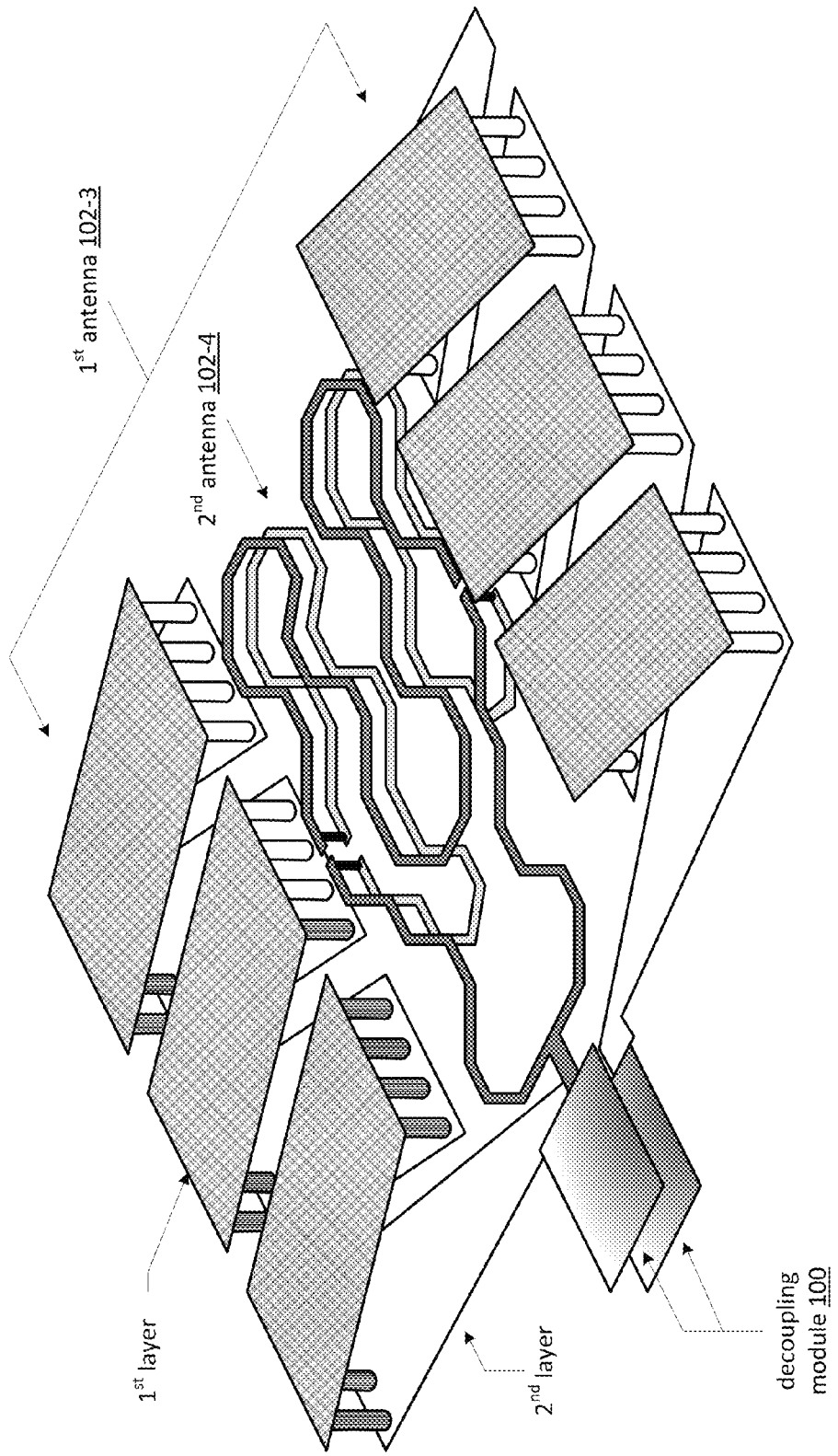
FIG. 17 is a diagram of an embodiment of a multiple antenna structure in accordance with the present invention.
Figure 18:
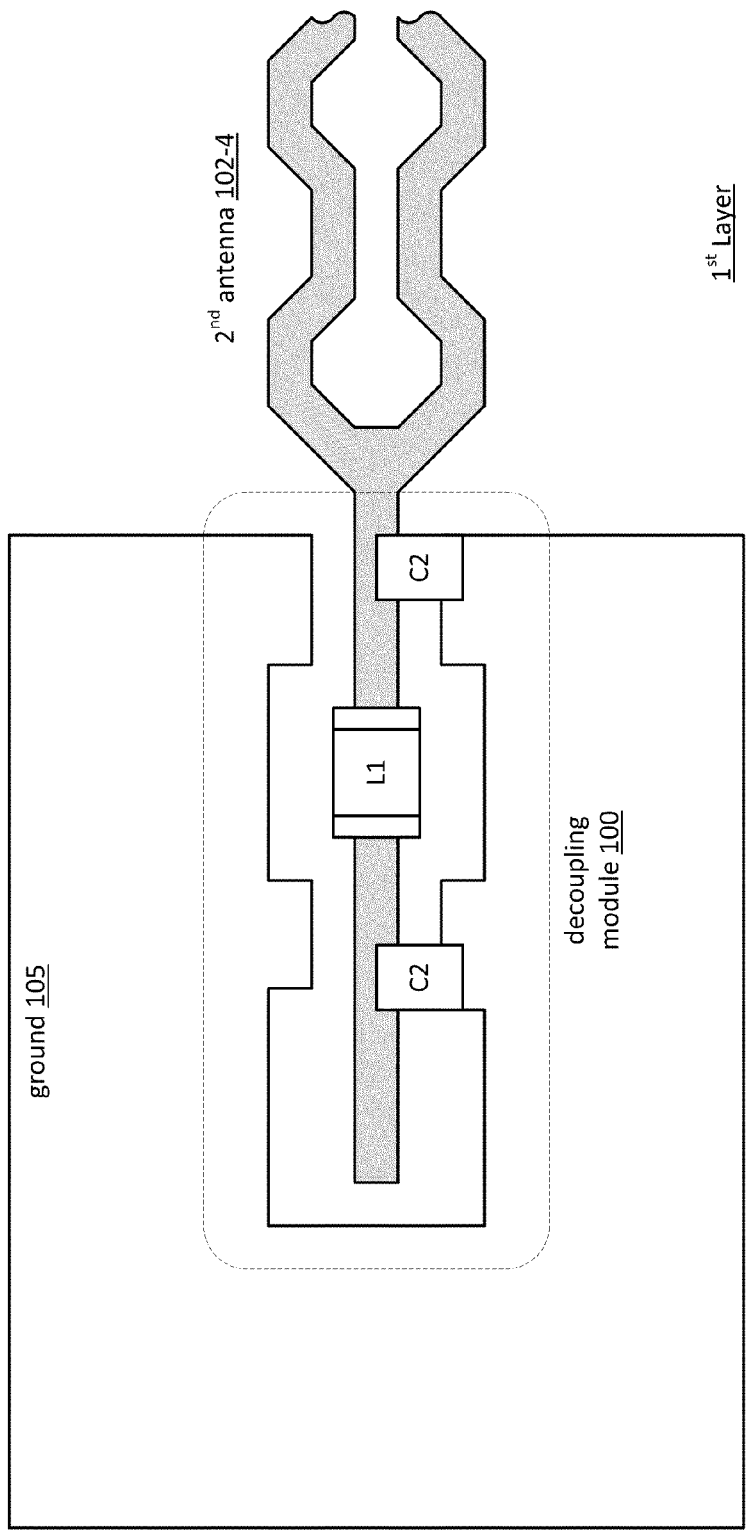
FIG. 18 is a block diagram of another embodiment of a first side of a dongle having a multiple antenna structure in accordance with the present invention.
Figure 19:
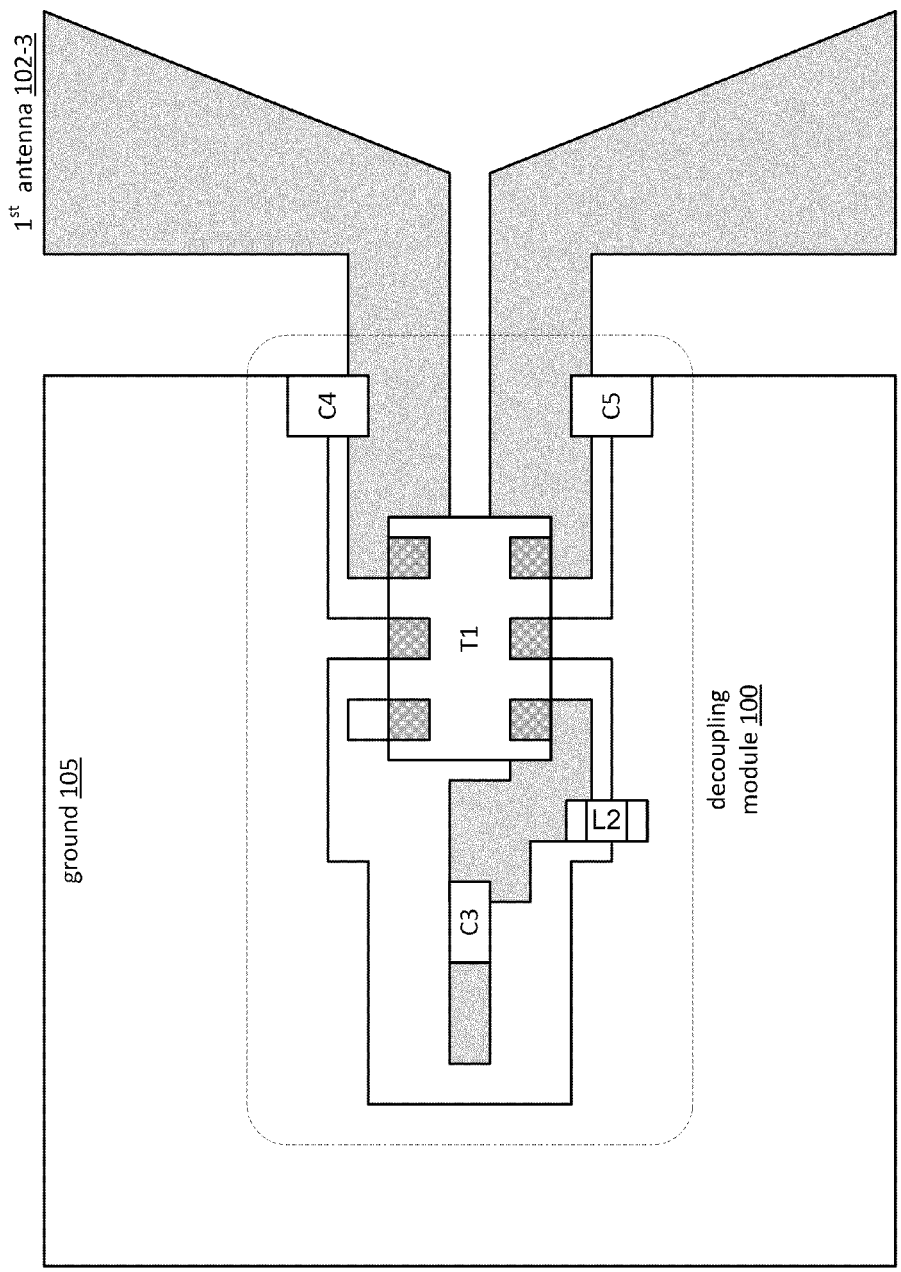
FIG. 19 is a block diagram of another embodiment of a second side of a dongle having a multiple antenna structure in accordance with the present invention.

FIGS. 17-19 illustrate various aspects of the dongle device of FIG. 15. For instance, FIG. 17 is an isometric diagram of the dipole antenna 103, the monopole antenna 101, and the decoupling module 100 of the dongle device. FIG. 18 is a diagram of the decoupling module 100 on the first side of the dongle device and FIG. 19 is a diagram of the decoupling module 100 on the first side of the dongle device.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:
1. A transceiver comprises:
a substrate having a first side and a second side;
a transceiver circuit on at least one of the first and second sides of the substrate;
a transmit/receive switch coupled to the transceiver circuit to select between one or more transmitter and receiver circuits:
a Multiple Input Multiple Output (MIMO) antenna structure on at least one of the first and second sides of the substrate; and
an inductor-capacitor (LC) decoupling module on at least one of the first and second sides of the substrate, wherein the LC decoupling module couples the MIMO antenna structure to the transmit/receive switch and isolates RF signals within a given frequency range transmitted or received by the antennas of the MIMO antenna structure; and
wherein the LC decoupling module comprises:
a plurality of antenna ports configured to couple to the antennas of the MIMO antenna structure;
a plurality of transceiver ports configured to couple to corresponding ports of the transmit/receive switch; and
a plurality of current steering circuits comprising inductors and capacitors and coupled to steer phase-shifted currents and non-phase shifted currents between the plurality of antenna ports and the plurality of transceiver ports to couple the antennas of the MIMO antenna structure and the transmit/receive switch and to isolate the RF signals transmitted or received by the antennas of the MIMO antenna structure.

2. The transceiver of claim 1, wherein the MIMO antenna structure comprises:
   a first monopole antenna; and
   a second monopole antenna.

3. The transceiver of claim 2 further comprises:
   the first monopole antenna formed along a first edge of the substrate and includes:
      first antenna elements on the first side of the substrate;
      second antenna elements on the second side of the substrate;
      a plurality of vias to linearly connect the first antenna elements to the second antenna elements to produce series connected antenna elements; and
      a connection element connected to the series connected antenna elements and to a first antenna port of the LC decoupling module; and
   the second monopole antenna formed along a second edge of the substrate and includes:
      third antenna elements on the first side of the substrate;
      fourth antenna elements on the second side of the substrate;
      a second plurality of vias to linearly connect the third antenna elements to the fourth antenna elements to produce a second series connected antenna elements; and
      a second connection element connected to the second series connected antenna elements and to a second antenna port of the LC decoupling module.

4. The transceiver of claim 1, wherein the MIMO antenna structure comprises:
   a monopole antenna; and
   a dipole antenna.

5. The transceiver of claim 4 further comprises:
   the dipole antenna includes a first antenna section and a second antenna section, wherein the first antenna section is formed along a first edge of the substrate and includes:
      first antenna elements on the first side of the substrate;
      second antenna elements on the second side of the substrate;
      a plurality of vias to linearly connect the first antenna elements to the second antenna elements to produce series connected antenna elements; and
      a connection element connected to the series connected antenna elements and to a first antenna port of the LC decoupling module; and
   the second antenna section is formed along a second edge of the substrate and includes:
      third antenna elements on the first side of the substrate;
      fourth antenna elements on the second side of the substrate;
      a second plurality of vias to linearly connect the third antenna elements to the fourth antenna elements to produce a second series connected antenna elements; and
      a second connection element connected to the second series connected antenna elements and to a second antenna port of the LC decoupling module; and
   the monopole antenna includes a plurality of antenna sections on the first and the second sides of the substrate, wherein the plurality of antenna sections are located between the first and second antenna sections of the dipole antenna.

6. The transceiver of claim 1 further comprises:
   a first ground plane on the first side of the substrate at a first end of the substrate;
   a second ground plane on the second side of the substrate at the first end of the substrate;
   the MIMO antenna structure on a second end of the substrate; and
   the LC decoupling module on the second end of the substrate.

7. An antenna assembly comprises:
   a substrate having a first side and a second side;
   a Multiple Input Multiple Output (MIMO) antenna structure on at least one of the first and second sides of the substrate; and
   an inductor-capacitor (LC) decoupling module on at least one of the first and second sides of the substrate, wherein the LC decoupling module is configured to couple the MIMO antenna structure to a transmit/receive switch selecting between one or more transmitter and receiver circuits and is configured to isolate RF signals within a given frequency range transmitted or received by the antennas of the MIMO antenna structure; and
   wherein the LC decoupling module comprises:
      a plurality of antenna ports configured to couple to the antennas of the MIMO antenna structure;
      a plurality of transceiver ports configured to couple to corresponding ports of the transmit/receive switch; and
      a plurality of current steering circuits comprising inductors and capacitors and coupled to steer phase-shifted currents and non-phase shifted currents between the plurality of antenna ports and the plurality of transceiver ports to couple the antennas of the MIMO antenna structure and the transmit/receive switch and to isolate the RF signals transmitted or received by the antennas of the MIMO antenna structure.

8. The antenna assembly of claim 7, wherein the MIMO antenna structure comprises:
   a first monopole antenna; and
   a second monopole antenna.

9. The antenna assembly of claim 8 further comprises:
   the first monopole antenna formed along a first edge of the substrate and includes:
      first antenna elements on the first side of the substrate;
      second antenna elements on the second side of the substrate;
      a plurality of vias to linearly connect the first antenna elements to the second antenna elements to produce series connected antenna elements; and
      a connection element connected to the series connected antenna elements and to a first antenna port of the LC decoupling module; and
   the second monopole antenna formed along a second edge of the substrate and includes:
      third antenna elements on the first side of the substrate;
      fourth antenna elements on the second side of the substrate;
      a second plurality of vias to linearly connect the third antenna elements to the fourth antenna elements to produce a second series connected antenna elements; and
      a second connection element connected to the second series connected antenna elements and to a second antenna port of the LC decoupling module.

10. The antenna assembly of claim 7, wherein the MIMO antenna structure comprises:
    a monopole antenna; and
    a dipole antenna.

11. The antenna assembly of claim 10 further comprises:
    the dipole antenna includes a first antenna section and a second antenna section, wherein the first antenna section is formed along a first edge of the substrate and includes:

first antenna elements on the first side of the substrate;
second antenna elements on the second side of the substrate;
a plurality of vias to linearly connect the first antenna elements to the second antenna elements to produce series connected antenna elements; and
a connection element connected to the series connected antenna elements and to a first antenna port of the LC decoupling module; and the second antenna section is formed along a second edge of the substrate and includes:
third antenna elements on the first side of the substrate;
fourth antenna elements on the second side of the substrate;
a second plurality of vias to linearly connect the third antenna elements to the fourth antenna elements to produce a second series connected antenna elements; and
a second connection element connected to the second series connected antenna elements and to a second antenna port of the decoupling module; and the monopole antenna includes a plurality of antenna sections on the first and the second sides of the substrate, wherein the plurality of antenna sections are located between the first and second antenna sections of the dipole antenna.

12. The antenna assembly of claim 7 further comprises:
a first ground plane on the first side of the substrate at a first end of the substrate;
a second ground plane on the second side of the substrate at the first end of the substrate;
the MIMO antenna structure on a second end of the substrate; and
the LC decoupling module on the second end of the substrate.

13. A transceiver comprises:
a substrate having a first side and a second side;
a transceiver circuit on at least one of the first and second sides of the substrate, the transceiver circuit including at least a first pair of RF receivers, each RF receiver configured to communicate inbound symbol streams of a differing RF frequency and at least a first pair of RF transmitters, each RF transmitter configured to communicate outbound symbol streams of a differing RF frequency;
a transmit/receive switch coupled to the at least a first pair of RF transmitters and the at least a first pair of RF receivers to select specific RF transmitters and RF receivers; a Multiple Input Multiple Output (MIMO) antenna structure on at least one of the first and second sides of the substrate; and
an inductor-capacitor (LC) decoupling module on at least one of the first and second sides of the substrate, wherein the LC decoupling module couples the MIMO antenna structure to the transmit/receive switch and isolates signals of a specific RF frequency range transmitted or received by the antennas of the MIMO antenna structure; and
wherein the LC decoupling module comprises:
a plurality of antenna ports configured to couple to the antennas of the MIMO antenna structure;
a plurality of transceiver ports configured to couple to corresponding ports of the transmit/receive switch; and
a plurality of current steering circuits comprising inductors and capacitors and coupled to steer phase-shifted currents and non-phase shifted currents between the plurality of antenna ports and the plurality of transceiver ports to couple the antennas of the MIMO antenna structure and the transmit/receive switch and to isolate the RF signals transmitted or received by the antennas of the MIMO antenna structure.

* * * * *